US010040926B2

(12) United States Patent
Akai et al.

(10) Patent No.: US 10,040,926 B2
(45) Date of Patent: Aug. 7, 2018

(54) RUBBER MODIFIER, RUBBER MODIFIER DISPERSION, AND RUBBER COMPOSITION

(71) Applicant: MITSUBISHI CHEMICAL CORPORATION, Tokyo (JP)

(72) Inventors: Hideko Akai, Kanagawa (JP); Yasutomo Noishiki, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/694,412

(22) Filed: Apr. 23, 2015

(65) Prior Publication Data

US 2015/0225552 A1    Aug. 13, 2015

Related U.S. Application Data

(63) Continuation of application No. PCT/JP2013/078610, filed on Oct. 22, 2013.

(30) Foreign Application Priority Data

Oct. 23, 2012  (JP) ................................. 2012-233945
Oct. 17, 2013  (JP) ................................. 2013-216455

(51) Int. Cl.
| C08L 7/02 | (2006.01) |
| C08L 1/02 | (2006.01) |
| C08L 21/00 | (2006.01) |
| C08L 97/02 | (2006.01) |
| C08L 1/08 | (2006.01) |
| C08L 1/12 | (2006.01) |
| D01F 2/24 | (2006.01) |
| C08L 1/04 | (2006.01) |
| C08B 3/06 | (2006.01) |
| C08B 5/00 | (2006.01) |
| C08B 15/04 | (2006.01) |
| C08L 1/16 | (2006.01) |
| C08L 7/00 | (2006.01) |

(52) U.S. Cl.
CPC ............ *C08L 7/02* (2013.01); *C08B 3/06* (2013.01); *C08B 5/00* (2013.01); *C08B 15/04* (2013.01); *C08L 1/02* (2013.01); *C08L 1/04* (2013.01); *C08L 1/08* (2013.01); *C08L 1/12* (2013.01); *C08L 1/16* (2013.01); *C08L 7/00* (2013.01); *C08L 21/00* (2013.01); *C08L 97/02* (2013.01); *D01F 2/24* (2013.01); *C08L 2205/16* (2013.01); *Y10T 428/298* (2015.01)

(58) Field of Classification Search
CPC .......... C08L 21/00; C08L 21/02; C08L 21/04; C08L 21/08; C08L 21/12; C08L 21/16; C08L 7/00; C08L 7/02; C08L 97/02; C08L 2205/16; C08K 7/02; C08B 15/04; C08B 3/06; C08B 5/00; D01F 2/24; Y10T 428/298

See application file for complete search history.

(56) References Cited

U.S. PATENT DOCUMENTS

| 6,117,545 A | 9/2000 | Cavaille et al. |
| 8,022,136 B2 * | 9/2011 | Yano ........................ B60C 1/00 524/13 |
| 2009/0054552 A1 * | 2/2009 | Yano ........................ C08J 5/06 523/200 |
| 2010/0233481 A1 * | 9/2010 | Isogai ..................... C08B 15/04 428/401 |
| 2012/0118520 A1 | 5/2012 | Noishiki et al. |
| 2012/0125547 A1 | 5/2012 | Akai |
| 2013/0338250 A1 | 12/2013 | Umemoto et al. |
| 2013/0345341 A1 | 12/2013 | Harada et al. |

FOREIGN PATENT DOCUMENTS

| CN | 101353826 A | * | 1/2009 |
| EP | 2 441 885 A1 | | 4/2012 |
| JP | 10-007811 | | 1/1998 |
| JP | 2005-133025 | | 5/2005 |
| JP | 2009-191197 | | 8/2009 |
| JP | 2009-197122 | | 9/2009 |
| JP | 2010025925 A | * | 2/2010 |
| JP | 2010-254925 | | 11/2010 |
| JP | 2010254925 A | * | 11/2010 |
| JP | 2011-79940 | | 4/2011 |
| JP | 2011-231208 | | 11/2011 |
| JP | 2011-235451 | | 11/2011 |
| JP | 2012-025949 | | 2/2012 |

(Continued)

OTHER PUBLICATIONS

JP 2010254925 A, Nov. 2010, Derwent Ab.*
CN 101353826 A, Jan. 2009, English Ab.*
Ma et al., Ultra-fine cellulose nanofibers: new nano-scale materials for water purification, Apr. 5, 2011, Journal of Material Chemistry, vol. 21, pp. 7507-7510.*
WO 2012115115 A1, Aug. 2012, Machine translation.*
WO 2012115115 A1, Aug. 2012, English Ab.*
JP 2010025925 A, Feb. 2010, Machine translation.*
Extended European Search Report dated Sep. 25, 2015 in Patent Application No. 13849561.9.

(Continued)

*Primary Examiner* — Satya Sastri
(74) *Attorney, Agent, or Firm* — Oblon, McClelland, Maier & Neustadt, L.L.P.

(57) ABSTRACT

The present invention provides a rubber modifier capable of exhibiting good dispersibility in a dispersion thereof and excellent in a rubber-modifying effect such as rubber-reinforcing effect or the likes. The invention relates to a rubber modifier comprising cellulose fibers, in which the number of the cellulose fibers having a fiber length of 450 nm or less, relative to the number of all the cellulose fibers therein, is 50% or more, to a rubber modifier dispersion comprising the rubber modifier and a dispersion medium, and to a rubber composition comprising the rubber modifier and a rubber component.

18 Claims, No Drawings

(56) References Cited

FOREIGN PATENT DOCUMENTS

| JP | 2013-018918 | 1/2013 | |
|---|---|---|---|
| JP | 2013-107927 A | 6/2013 | |
| JP | 2013-129767 | 7/2013 | |
| JP | 2013-177540 | 9/2013 | |
| JP | 2013-241586 | 12/2013 | |
| WO | WO 2011/070923 A1 | 6/2011 | |
| WO | WO 2012/115115 A1 | 8/2012 | |
| WO | WO 2012115115 A1 * | 8/2012 | ............. D21H 11/20 |
| WO | WO 2014/142316 A1 | 9/2014 | |
| WO | WO 2014/142319 A1 | 9/2014 | |

OTHER PUBLICATIONS

International Search Report dated Dec. 24, 2013 in PCT/JP2013/078610 filed Oct. 22, 2013.
Office Action dated Oct. 4, 2016 in Japanese Patent Application No. 2013-216455 (with machine English translation).

* cited by examiner

RUBBER MODIFIER, RUBBER MODIFIER DISPERSION, AND RUBBER COMPOSITION

TECHNICAL FIELD

The present invention relates to a rubber modifier, and precisely to a rubber modifier that comprises cellulose fibers.

The present invention also relates to a rubber modifier dispersion and a rubber composition containing the rubber modifier.

BACKGROUND ART

A technique of mixing fibers in rubber to improve the hardness and the modulus of the rubber has already been known. Fibers having a large diameter may readily disperse in rubber but may lower the physical properties such as fatigue resistance and the like of rubber; but on the contrary, fibers having a small diameter could improve the fatigue resistance of rubber but may aggregate and may become entangled together to worsen the dispersibility thereof in rubber.

PTL 1 proposes a method of satisfying both dispersibility and fatigue resistance, which comprises dispersing blend fibers having a sea/island-structured cross-section in rubber and fibrillating the fibers by the shearing force given thereto during mixing to thereby increase the contact area of the resultant fibers with rubber.

PTL 2 discloses a fact that when a bacterial cellulose having a small diameter of 0.1 µm along with starch serving as a reinforcing agent is mixed in a dienic rubber for the purpose of improving the abrasion resistance of rubber, then the abrasion resistance index of the resultant mixture improves as compared with that in a case where starch alone is incorporated.

CITATION LIST

Patent Literature

[PTL 1] JP-A 10-7811
[PTL 2] JP-A 2005-133025

SUMMARY OF INVENTION

Technical Problem

However, the fibers disclosed in PTL 1 form the sea/island structure through phase-separation of resin, and therefore their thickness and length are not uniform. The diameter of the fibers is 1 µm and 0.7 µm and is large, and the contact area thereof with rubber could not be said to be sufficient, and a significant reinforcing effect could not be expected.

On the other hand PTL 2 says that the cellulose alone is problematic in the workability thereof, in which, therefore, starch is incorporated in an amount of 5 times or more the amount of cellulose. A bacterial cellulose disperses in nano-size in water, but tends to aggregate in rubber, and therefore in this, starch would be incorporated for improving the dispersibility of the cellulose in rubber. However, the starch cancels the reinforcing effect and it is expected that the reinforcing effect would be still insufficient.

Given the situation, an object of the present invention is to provide a rubber modifier comprising cellulose fibers, which exhibits excellent dispersibility in a dispersion thereof and which is excellent in a rubber-improving effect of reinforcing rubber, etc.

Another object of the present invention is to provide a rubber modifier capable of giving a rubber composition that has a high modulus of elasticity, a high breaking strength and a low-heat-generating property/

Solution to Problem

As a result of having made assiduous studies, the present inventors have found that, when cellulose fibers having a relatively short fiber length are used as a rubber modifier, then the above-mentioned problems can be solved, and have achieved the present invention.

Specifically, the gist of the present invention is as follows:
<1> A rubber modifier comprising cellulose fibers, wherein the number of the cellulose fibers having a fiber length of 450 nm or less, relative to the number of all the cellulose fibers therein, is 50% or more.
<2> The rubber modifier according to the <1> above, wherein the number-average fiber diameter of the cellulose fibers is 20 nm or less.
<3> The rubber modifier according to the <1> or <2> above, wherein the number-average fiber length of the cellulose fibers is 450 nm or less.
<4> The rubber modifier according to any one of the <1> to <3> above, wherein the cellulose fibers are modified cellulose fibers.
<5> A rubber modifier dispersion comprising the rubber modifier of any one of the <1> to <4> above, and a dispersion medium.
<6> The rubber modifier dispersion according to the <5> above, further comprising a rubber component.
<7> A rubber composition comprising: the rubber modifier according to any one of <1> to <4> above; and a rubber component.

Advantageous Effects of Invention

The rubber modifier of the present invention exhibits excellent dispersibility in a dispersion thereof, especially in a dispersion thereof containing a rubber component. Further, even in a rubber composition, the material exhibits good dispersibility. In addition, the rubber composition containing the rubber modifier of the present invention has a high modulus of elasticity and a high breaking strength and has a high reinforcing effect for rubber, and the heat-generating property thereof is low.

DESCRIPTION OF EMBODIMENTS

Embodiments of the present invention are described below. However, the description of the constituent components given below is for some examples (typical examples) of the embodiments of the present invention, and not overstepping the scope and the spirit thereof, the present invention is now whatsoever restricted to the following contents.

[Rubber Modifier]

The rubber modifier of the present invention comprises cellulose fibers, in which the number of the cellulose fibers having a fiber length of 450 nm or less, relative to the number of all the cellulose fibers therein, is 50% or more.

The cellulose fibers to be contained in the rubber modifier of the present invention may be produced according to any production method.

In general, the rubber modifier of the present invention may be produced by fibrillating a cellulose fiber source material to be mentioned in detail hereinunder and aligning the fiber length. For example, cellulose fibers are processed for pretreatment such as oxidization treatment, enzymatic treatment or the like followed by further treatment of chemical treatment, physical treatment or the like whereby the rubber modifier can be produced favorably.

The rubber modifier of the present invention may also be produced, for example, by fibrillating a cellulose fiber source material to be mentioned in detail hereinunder and then aligning the fiber length, or may also be produced by fibrillating the cellulose fiber source material kept dispersed in a rubber latex and then aligning the fiber length. In addition, the rubber modifier may also be produced through additional treatment of cutting the cellulose fiber source material.

<Fiber Length of Cellulose Fibers>

The cellulose fibers to be used for the rubber modifier of the present invention are characterized in that the number of the cellulose fibers having a fiber length of 450 nm or less, relative to the number of all the cellulose fibers, is 50% or more.

The number of the cellulose fibers having a fiber length of 450 nm or less may be 50% or more relative to the number of all the cellulose fibers, but preferably 60% or more, more preferably 70% or more, even more preferably 80% or more, still more preferably 85% or more, and is generally 99% or less. Controlling the proportion of the number of the cellulose fibers having a fiber length of 450 nm or less to fall within the range improves the dispersibility of the fibers in rubber and provides another advantage in that, when a rubber composition is produced using the improving material, the rubber composition can exhibit well-balanced effects of breaking strength, elastic modulus and low-heat-generating property.

The number-average fiber length of the cellulose fibers to be used as the rubber modifier of the present invention is preferably 450 nm or less, more preferably 425 nm or less, even more preferably 400 nm or less, and is generally 50 nm or more.

<Fiber Diameter of Cellulose Fibers>

The number-average fiber diameter of the cellulose fibers to be used as the rubber modifier of the present invention is preferably 20 nm or less, more preferably 15 nm or less, even more preferably 10 nm or less, still more preferably 8 nm or less, most preferably 7 nm or less. The number-average fiber diameter of the cellulose fibers is preferably as small as possible, but for expressing a high reinforcing effect, it is important to keep cellulose crystallinity, and therefore, the number-average fiber diameter is preferably 2 nm or more, and substantially, the fiber diameter is more preferably 4 nm or more that is the cellulose crystal unit. In case where the mean fiber diameter of the cellulose fibers is less than the above-mentioned lower limit, then the I-type crystal structure of cellulose could not be maintained so that the strength and the elastic modulus of the fibers themselves would lower and the fibers could hardly secure the reinforcing effect. On the other hand, in case where the mean fiber diameter of the cellulose fibers is more than the above-mentioned upper limit, then the contact area of the fibers with rubber would be small so that the reinforcing effect of the fibers would lower.

The fiber length and the fiber diameter of the cellulose fibers of the rubber modifier of the present invention may be measured by removing the dispersion medium from the rubber modifier dispersion through dryness (for sheet formation), and observing the resulting sheet with a scanning electronic microscope (hereinafter this may be referred to as "SEM"), a transmission electronic microscope (hereinafter this may be referred to as "TEM") or an atomic force microscope (hereinafter this may be referred to as "AFM"), or through small-angle X-ray scattering (hereinafter this may be referred to as "SAXS") or the like. The cellulose fibers in a dispersion thereof containing a rubber component such as a rubber latex or the like may also be analyzed by removing the rubber component and by observing the resultant sheet in the same manner as above.

<Cellulose Fiber Source Material>

In the present invention, the cellulose fiber source material is one prepared by removing impurities from a cellulose-containing substance to be mentioned below according to an ordinary purification process.

(Cellulose-Containing Substance)

As the cellulose-containing substance, there are mentioned natural celluloses, for example, vegetable-derived source materials that include wood (wood powder) of softwood, hardwood or the like, cotton such as cotton linter, cotton lint or the like, bagasse of sugar cane, sugar beet or the like, bast fibers of flax, ramie, jute, kenaf or the like, nerved fibers of sisal, pineapple or the like, petiole fibers of Abaca, banana or the like, fruit fibers of coconut palm, shaft fibers of bamboo or the like, as well as bacterial cellulose produced by bacteria, seaweeds such as valonia, Cladophorales or the like, ascidian encysts, etc. These natural celluloses are preferred as having high crystallinity and therefore capable of having a low linear expansion coefficient and a high elastic modulus. In particular, preferred here are cellulose fibers to be collected from vegetable-derived source materials.

Woody materials of hardwood, softwood and the like can give fine fibers, and in addition, these are the greatest biological resources on earth, and are sustainable resources that are said to be produced in an amount of about 70,000,000,000 ton/year or more. Consequently, these greatly contribute toward carbon dioxide reduction that has an influence on global warming, and therefore hold the high ground from the economical viewpoint.

(Cellulose Fiber Source Material)

The cellulose fiber source material may be obtained by purifying the above-mentioned cellulose-containing substance according to an ordinary method.

For example, the substance is defatted with benzene-ethanol or an aqueous solution of sodium carbonate and then delignified with a chlorite salt (Wise method), and thereafter processed with an alkali for hemicellulose removal to give the intended source material. Apart from the Wise method, a method of using peracetic acid (pa method), a method of using a peracetic acid/persulfuric acid mixture (pxa method) or the like is also employable as the purification method. If desired, any other additional treatment of bleaching or the like may also be employed.

For the purification treatment, water is generally used as the dispersion medium, but an acid or a base, or an aqueous solution of any other treatment agent may also be used, and in the case, the system may be finally washed with water.

The cellulose fiber source material may also be one to be obtained according to an ordinary chemical pulp production method, for example, a production method for kraft pulp, sulfide pulp, alkali pulp, nitrate pulp or the like.

Specifically, as the cellulose fiber source material, usable here is pulp of hardwood kraft pulp, softwood kraft pulp, hardwood sulfite pulp, softwood sulfite pulp, bleached hardwood kraft pulp, bleached softwood kraft pulp, linter pulp or the like.

As the cellulose fiber source material, also usable is ground pulp, for example, SGW (stone groundwood) or CGP (chemical groundwood pulp) prepared through light chemical treatment with sodium sulfite or the like followed by grinding treatment or the like. Preferred here is use of ground softwood pulp or hardwood pulp.

A cellulose-containing substance may be pulverized or ground into wood chips or wood powder, and the pulverizing or grinding treatment may be carried out at any timing before, during or after purification treatment.

The degree of purification of the cellulose fiber source material to be obtained by purifying the cellulose-containing substance is not specifically defined. Preferably, in the source material, the content of fat, oil and lignin is small and the content of the cellulose component is large, since the cellulose fiber source material of the type is discolored little. Preferably, the content of the cellulose component in the cellulose fiber source material is 80% by weight or more, more preferably 90% by weight or more, even more preferably 95% by weight or more.

The cellulose component in the cellulose fiber source material is grouped into a crystalline α-cellulose component and an amorphous hemi-cellulose component. Preferably, in the source material, the crystalline α-cellulose content is high. This is because, when the cellulose fibers of the type are used in producing a rubber composition, the rubber composition can readily enjoy the effects of the fibers of securing a low linear expansion coefficient, a high elastic modulus and a high strength of the composition. The α-cellulose content in the cellulose fiber source material is preferably 70% by weight or more, more preferably 75% by weight or more, even more preferably 80% by weight or more.

The fiber diameter of the cellulose fiber source material is not specifically defined. In general, the number-average fiber diameter of the material is from 1 μm to 1 mm. Those that have been purified in an ordinary manner may have a fiber diameter of 50 μm or so.

The number-average fiber length of the cellulose fiber source material is generally from 0.1 mm to 10 mm or so.

<Pretreatment of Cellulose Fibers>

The cellulose fibers in the present invention may be obtained by directly fibrillating the above-mentioned cellulose fiber source material, but for efficiently obtaining finer cellulose fibers through fibrillation, the source material may be pretreated.

The pretreatment includes oxidation treatment or enzymatic treatment of cellulose, etc. Through the pretreatment, the fiber length after fibrillation may be shortened.

Embodiments of oxidation treatment of cellulose are mentioned below.

(Oxidation Treatment)

Through oxidation treatment of the above-mentioned cellulose fiber source material, a carboxyl group may be introduced into the cellulose that constitutes the cellulose fibers. Further, as the case may be, a formyl group may be simultaneously introduced thereinto.

Having a carboxyl group introduced thereinto, the surfaces of the cellulose fibers can be covered with the negative charge of the carboxyl group and therefore a repulsive force would be generated between the cellulose fibers and, as a result, it is presumed that the dispersibility of the fibers in a rubber latex could be improved and the fibers could be given an effect of improving the fibrillation capability thereof.

Preferably, the cellulose fibers in the present invention are substituted with a carboxyl group in a ratio of 0.1 mmol/g or more relative to the weight of the cellulose fibers, more preferably 0.15 mmol/g or more, even more preferably 0.2 mmol/g or more, and is generally 3.0 mmol/g or less, preferably 1.5 mmol/g or less, more preferably 1.2 mmol/g or less, even more preferably 1.0 mmol/g or less.

The cellulose fibers in the present invention may further have a formyl group. Regarding the ratio of the carboxyl group to the formyl group, it is desirable that the carboxyl group is larger. Preferably, the amount of the carboxyl group is 2 molar times or more that of the formyl group, more preferably 5 molar times or more, even more preferably 10 molar times or more. The cellulose fibers may not have a formyl group but may have a carboxyl group alone. When the amount of the formyl group is large, a risk of increasing the discoloration of the fibers in heating would be presumed.

A case of oxidation of a cellulose fiber source material is described below. Apart from the case, however, a cellulose fiber source material is not oxidized but cellulose fibers after fibrillation may be oxidized in the manner to be mentioned below also to give the cellulose fibers for use in the present invention.

A concrete method for oxidation is not specifically defined. Employable here is a method of bringing a gas having an oxidizing capability (hereinafter this may be referred to as "oxidizing gas") into contact with a cellulose fiber source material, a method of suspending or immersing a cellulose fiber source material in a solution containing an oxidizing chemical species, or the like.

The oxidizing gas is not specifically defined. There are mentioned ozone, chlorine gas, fluorine gas, chlorine dioxide, nitrogen suboxide, etc. Two or more of these may be combined for use herein. Especially preferred is ozone, since a necessary amount of ozone may be generated in any service space at any necessary time by supplying an oxygen-containing vapor such as air, oxygen gas, oxygen-added air or the like into an ozone generator, and such an ozone generator is commercially available and can be used in a simplified manner.

In case where any other gas than the oxidizing gas exists in the oxidizing gas-existing atmosphere or in the oxidizing gas stream, the co-existing gas may be any one that would not detract from the oxidation of the hydroxyl group of cellulose, and includes air, oxygen gas, nitrogen gas, carbon dioxide, argon gas, etc. Two or more of these may be contained in the oxidizing atmosphere.

As the oxidizing chemical species, in general, usable here is any reagent capable of oxidizing an alcohol or aldehyde into a carboxylic acid. Not specifically defined, there may be mentioned chromic acid oxidation reagents such as hexavalent chromic acid/sulfuric acid mixed liquid, Johns reagent (acid solution of chromic anhydride with sulfuric acid), pyridinium chlorochromate (PCC reagent) or the like, activated dimethylsulfoxide reagents to be used in Swern oxidation or the like, as well as N-oxyl compounds such as tetrapropylammonium perruthenate (TPAP), 2,2,6,6-tetramethylpiperidin-1-oxyl (TEMPO) or the like to provide catalytic oxidation. In particular, it is known that oxidation of cellulose fibers by TEMPO can go on under a mild condition in an aqueous dispersion, and the reagent is therefore preferred here.

In suspending or immersing a cellulose fiber source material in a solution containing an oxidizing chemical species, the cellulose fiber source material may be in a completely dried state and the dry source material may be added to the solution containing an oxidizing chemical species, or an oxidizing chemical species may be added to a dispersion of cellulose fibers. The solvent or the dispersion medium for the solution containing an oxidizing chemical species or the cellulose fiber dispersion is generally water, but may contain any other solvent.

After oxidation, the cellulose fibers are preferably sufficiently washed in suspension with water and/or organic solvent.

(Additional Oxidation Treatment)

After the oxidation treatment according to the method of bringing an oxidizing gas into contact with a cellulose fiber source material or according to a method of suspending or immersing a cellulose fiber source material in a solution containing an oxidizing chemical species, the resultant cellulose fibers may be further processed in an additional oxidation step. The additional oxidation treatment makes it possible to further oxidize the formyl group in the cellulose fibers into a carboxyl group to thereby improve the fibrillation capability of the fibers, or provides an additional effect of preventing discoloration of the fibers in heating. Consequently, the additional oxidation treatment is more preferred here.

(Method of Quantification of Carboxyl Group and Formyl Group in Cellulose Fibers)

In the present invention, the amount (mmol/g) of the carboxyl group and the formyl group in the cellulose fibers relative to the weight of the cellulose fibers was quantified according to the method mentioned below.

The carboxyl group amount and the formyl group amount were quantified according to "Test Method T237 cm-08 (2008): Carboxyl Content of Pulp" in US TAPPI. In this, the absolutely-dried cellulose fibers to be the sample for measurement are those prepared through lyophilization for evading thermal degradation of cellulose that may occur in drying by heating.

Regarding the carboxyl group amount and the formyl group amount in the cellulose fibers, the value of the amount per gram of dry cellulose may change when the cellulose fibers are processed for chemical modification, since the mass of cellulose would increase by the amount of the chemical-modifying group added to the cellulose. Consequently, in case where the cellulose fibers in the present invention are further processed for chemical modification, the carboxyl group amount and the formyl group amount of the cellulose fibers must be calculated as the value after the substitution treatment with the chemical modifying group.

<Enzymatic Treatment>

Enzymatic treatment of cellulose fibers gives fine cellulose fibers more efficiently. As the enzyme, preferred is cellulase enzyme or hemicellulase enzyme.

Cellulase enzyme is an enzyme of cleaving the β-1,4-glucoside bond of cellulose through hydrolysis to cause depolymerization. In the present invention, as the cellulase enzyme, usable is any of endo-glucanase (EG) or cellobiohydrolase (CBH). These may be used singly or EG and CBH may be used as combined. In addition, the enzyme may be used along with hemicellulase enzyme as combined.

The hemicellulase enzyme usable in the present invention is an enzyme of hydrolyzing hemicellulose. The hemicellulase enzyme includes xylanase that is an enzyme of decomposing xylan, mannase that is an enzyme of decomposing mannan, and arabanase that is an enzyme of decomposing araban. In addition, pectinase that is an enzyme of decomposing pectin is also usable here as the hemicellulase enzyme.

<Modified Cellulose Fibers>

Cellulose that constitutes the cellulose fibers for use as the rubber modifier of the present invention may be of modified cellulose fibers in which a part of the hydroxyl group is substituted with any other group. The rubber modifier of the present invention preferably contains modified cellulose fibers, since the affinity thereof with rubber increases in the later step of complexing them with rubber.

For producing modified cellulose fibers, for example, any other group is introduced into the hydroxyl group in cellulose through chemical or physical treatment. The other group introduction may be attained for the cellulose fiber source material, or may be attained for the cellulose fibers after fibrillation treatment.

As the other group to be introduced into the hydroxyl group in cellulose, there are mentioned one or more of a carboxyl group, an acyl group, an isocyanate group, an alkyl group, an oxirane group, an oxetane group, a thiirane group, a thietane group, an amino group, an onium group, a carboxylic acid-derived group, a phosphoric acid-derived group, etc.

Concretely, the acyl group includes an acetyl group, an acryloyl group, a methacryloyl group, a propionyl group, a propioloyl group, a butyl group, a 2-butyryl group, a pentanoyl group, a hexanoyl group, a heptanoyl group, an octanoyl group, a nonanoyl group, a decanoyl group, an undecanoyl group, a dodecanoyl group, a myristoyl group, a palmitoyl group, a stearoyl group, a pivaloyl group, a benzoyl group, a naphthoyl group, a nicotinoyl group, an isonicotinoyl group, furoyl group, a cinnamoyl group, etc.

Concretely, the isocyanate group includes a 2-methacryloyloxyethylisocyanoyl group, etc.

Concretely, the alkyl group includes a methyl group, an ethyl group, a propyl group, a 2-propyl group, a butyl group, a 2-butyl group, a tert-butyl group, a pentyl group, a hexyl group, a heptyl group, an octyl group, a nonyl group, a decyl group, an undecyl group, a dodecyl group, a myristyl group, a palmityl group, a stearyl group, etc.

Of those, especially preferred are an acyl group having from 2 to 12 carbon atoms such as an acetyl group, an acryloyl group, a methacryloyl group, a benzoyl group, a naphthoyl group, etc.; an alkyl group having from 1 to 12 carbon atoms such as a methyl group, an ethyl group, a propyl group, etc.; an onium group, a carboxylic acid-derived group and a phosphoric acid-derived group.

The method of introducing the above-mentioned other group through chemical treatment is not specifically defined. There is mentioned a method of reacting a chemical-modifying agent to be mentioned below with the cellulose fiber source material or the cellulose fibers after fibrillation treatment. The reaction condition is not also specifically defined. If desired, a solvent, a catalyst and the like may be used, and the reaction system may be heated or the pressure thereof may be reduced.

Regarding the type of the chemical-modifying agent, there are mentioned one or more selected from a group consisting of acids, acid anhydrides, alcohols, halogenating reagents, isocyanates, alkoxysilanes, cyclic ethers such as oxiranes (epoxy compounds), etc., and glycidyltrialkylammonium halides or their halohydrins, phosphoric acid or phosphoric acid derivatives.

As the acids, for example, there are mentioned acetic acid, acrylic acid, methacrylic acid, propanoic acid, butanoic acid, 2-butanoic acid, pentanoic acid, etc.

As the acid anhydrides, for example, there are mentioned acetic anhydride, acrylic anhydride, methacrylic anhydride, propanoic anhydride, butanoic anhydride, 2-butanoic anhydride, pentanoic anhydride, etc.

As the halogenating reagents, for example, there are mentioned acetyl halide, acryloyl halide, methacryloyl halide, propanoyl halide, butanoyl halide, 2-butanoyl halide, pentanoyl halide, benzoyl halide, naphthoyl halide, etc.

As the alcohols, for example, there are mentioned methanol, ethanol, propanol, 2-propanol, etc.

As the isocyanates, for example, there are mentioned methyl isocyanate, ethyl isocyanate, propyl isocyanate, etc.

As the alkoxysilanes, for example, there are mentioned methoxysilane, ethoxysilane, etc.

As the cyclic ethers such as oxiranes (epoxy compounds) and the like, for example, there are mentioned ethyloxirane, ethyloxetane, etc.

Of those, especially preferred are acetic anhydride, acrylic anhydride, methacrylic anhydride, benzoyl halide, naphthoyl halide.

One alone or two or more of these chemical-modifying agents may be use here either singly or as combined.

(Cellulose Phosphate Fibers)

Cellulose fibers in which a part of the hydroxy group in the cellulose constituting the cellulose fibers is substituted with a phosphoric acid-derived group and in which, therefore the phosphoric acid-derived group has been introduced (hereinafter this may be referred to as "cellulose phosphate fibers"), which are favorable as the modified cellulose fibers for use in the present invention, are described below.

Here, the phosphoric acid-derived group is a group that bonds to cellulose through reaction of a phosphoric acid or a phosphoric acid derivative and the hydroxy group in cellulose. In general, cellulose phosphate as referred to herein is one in which a part of the hydroxyl group in cellulose is substituted with at least one phosphoric acid-derived group selected from a group consisting of a phosphoric acid group, a phosphorous acid group, a phosphonic acid group, a polyphosphoric acid group and a polyphosphonic acid group, and is preferably one substituted with a phosphoric acid group ($HPO_4^{2-}$ or $H_2PO_4^-$) or a polyphosphoric acid group, and more preferably one substituted with a phosphoric acid group, and for example, $HPO_4^{2-}$ or $H_2PO_4^-$ is a phosphoric acid-derived group. The hydrogen atom in the phosphoric acid-derived group may be substituted with any other group, and for example, the group may form a salt. More concretely, the group may form a salt with an alkali metal ion such as sodium, potassium, lithium or the like, or an alkaline earth metal ion such as calcium, magnesium or the like, or an ammonium ion of ammonia, an aliphatic amine, an aromatic amine, an aliphatic ammonium, an aromatic ammonium or the like.

As the method of introducing a phosphoric acid-derived group into cellulose, there may be mentioned a method of mixing a dry- or wet-state cellulose fiber source material or fibrillated cellulose with a powder or an aqueous solution of a phosphoric acid or a phosphoric acid derivative, a method of adding an aqueous solution of a phosphoric acid or a phosphoric acid derivative to a dispersion of a cellulose fiber source material or fibrillated cellulose fibers.

In these methods, in general, after a powder or an aqueous solution of a phosphoric acid or a phosphoric acid derivative has been added, the system is dewatered or heated.

For example, there is mentioned a method in which an aqueous solution of a phosphorylating reagent is prepared by mixing two types of sodium dihydrogenphosphate and disodium hydrogenphosphate followed by controlling the pH of the resultant mixture to be from 5 to 7, then a wet-state cellulose fiber source material is immersed in or mixed with the aqueous solution of the phosphorylating reagent, and thereafter the system is heated at a temperature of 130° C. or lower (especially preferably at a temperature of 110° C. or lower) so as to fully remove the water component from the cellulose fibers source material, and the resultant fibers are heated at from 130 to 170° C.

As the phosphoric acid and the phosphoric acid derivative to be used here, there is mentioned at least one compound selected from a phosphorus atom-containing oxo acids, polyoxo acids or their derivatives. Concretely, there are mentioned phosphoric acid, polyphosphoric acid, phosphorous acid, phosphonic acid, polyphosphonic acid, or their salts or esters. Above all, preferred are phosphoric acid, polyphosphoric acid or their salts. As the salts, preferred are salts with an alkali metal such as sodium, potassium or the like, ammonium salts or amine salts. Especially of those, preferred are phosphoric acid, sodium, potassium or ammonium phosphate, polyphosphoric acid, sodium, potassium or ammonium polyphosphate, from the viewpoint of high phosphoric acid group-introducing efficiency, easiness in fibrillation and easiness in industrial application; and more preferred are phosphoric acid, sodium phosphate, potassium phosphate and ammonium phosphate.

Concretely, the phosphoric acid and the phosphoric acid derivative include phosphoric acid; sodium phosphates such as sodium dihydrogenphosphate, disodium hydrogenphosphate, trisodium phosphate, etc.; sodium polyphosphates such as sodium pyrophosphate, sodium metaphosphate, etc.; potassium phosphates such as potassium dihydrogenphosphate, dipotassium hydrogenphosphate, tripotassium phosphate, etc.; potassium polyphosphates such as potassium pyrophosphate, potassium metaphosphate, etc.; ammonium phosphates such as ammonium dihydrogenphosphate, diimmonium hydrogenphosphate, triammonium phosphate, etc.; ammonium polyphosphates such as ammonium pyrophosphate, ammonium metaphosphate, etc. Especially preferred are sodium dihydrogenphosphate and disodium hydrogenphosphate.

One alone or two or more of these may be used here either singly or as combined. Specifically, two or more phosphoric acid-derived groups may be introduced into the cellulose phosphate fiber. For example, two or more phosphoric acid-derived groups that differ in that the hydrogen atom in each group has been substituted with a different group may be introduced into the cellulose phosphate fiber.

In order that the phosphoric acid-derived group introduced into cellulose could have a salt form, the fibers may be treated with an aqueous alkali solution after treated with the above-mentioned phosphoric acid or phosphoric acid derivative. After the treatment, in general, the fibers are washed with water until the dispersion thereof could have a neutral pH.

(Amount of Other Group Introduced into Modified Cellulose Fibers)

In the modified cellulose fibers, the other group has been introduced generally in an amount of from 0.1 to 8.0 mmol/g relative to the cellulose fibers, preferably in an amount of from 0.1 to 2.0 mmol/g.

In case where the modified cellulose fibers have two or more other groups, the total amount of these groups introduced into the cellulose fibers is generally from 0.1 to 8.0 mmol/g, preferably from 0.1 to 2.0 mmol/g.

Increasing the amount of the other group introduced in the cellulose fibers is preferable as increasing the affinity of the fibers with rubber in the later step of complexing the fibers with rubber. However, when the amount is too small, then the effect of improving the affinity with the fibers having the group introduced thereinto could not be sufficiently expressed.

Here, the amount of the other group introduced, for example, the amount of the phosphoric acid-derived group introduced into cellulose fibers may be determined according to the method mentioned below.

<Amount of Phosphoric Acid-Derived Group Introduced>

The amount of the phosphoric acid-derived group introduced into cellulose was calculated according to "Test Method T237 cm-08 (2008): Carboxyl Content of Pulp" in US TAPPI. Concretely, in order to make it possible to calculate the amount of the phosphoric acid-derived acid introduced into cellulose in a broader range, the test solution prepared by dissolving and diluting sodium hydrogencarbonate ($NaHCO_3$)/sodium chloride (NaCl)=0.84 g/5.85 g in 1000 ml of distilled water, among the test solutions for use in the above-mentioned test method, is changed to a test solution prepared by dissolving and diluting 1.60 g of sodium hydroxide in 1000 ml of distilled water, and further, the difference in the calculated values of the cellulose fibers before and after the substituent introduction is calculated as the substantial substituent introduction amount (monohydric acid value), according to "Test Method T237 cm-08 (2008): Carboxyl Content of Pulp". Further, for calculating the amount introduced of the phosphoric acid-derived group that is a polyhydric acid group, the substituent introduction amount calculated in the above is divided by the acid valence number of the phosphoric acid-derived group, and the resultant numerical value is referred to as the phosphoric acid-derived group introduction amount.

<Fibrillation Treatment>

The above-mentioned cellulose fiber source material is fibrillated to give the rubber modifier of the present invention.

The fibrillation treatment is not specifically defined. As a concrete method for the fibrillation, for example, there are mentioned a method that comprises putting ceramic beads each having a diameter of from 0.1 mm to 1 mm or so into a dispersion of a cellulose fiber source material having a cellulose fiber source material concentration of from 0.1 to 10% by weight, for example, 1% by weight or so (hereinafter this may be referred to as "cellulose fiber dispersion"), and shaken using a paint shaker, a bead mill or the like to thereby fibrillate the cellulose fiber source material, a method of fibrillating the source material with a grinder (stone grinder), etc. In particular, these methods are effective for shortening the fiber length of the resultant cellulose fibers.

As the dispersion medium for the cellulose fiber dispersion, usable are organic solvents, water, mixtures of organic solvent and water. As the organic solvent, usable are one or more of alcohols such as methanol, ethanol, isopropyl alcohol, n-propyl alcohol, n-butanol, ethylene glycol, glycerin, ethylene glycol mono-t-butyl ether, etc.; ketones such as acetone, methyl ethyl ketone, etc.; cyclic ethers such as tetrahydrofuran, etc.; and other water-soluble organic solvents. The dispersion medium is preferably a mixture of an organic solvent and water, or water. Especially preferred is water.

As the fibrillation method, there are mentioned a method that comprises introducing a cellulose fiber dispersion into a blender-type disperser or into a slit rotating at a high speed to thereby fibrillate it with a shearing force applied thereto (a method of using a high-speed rotary homogenizer), or a method that comprises generating a shearing force between cellulose fibers by rapid pressure reduction from high pressure to thereby fibrillate the fibers (a method of using a high-pressure homogenizer), a method using a contra-collision disperser such as "Masukomizer X (by Masuko Sangyo), etc. In particular, treatment using a high-speed rotary homogenizer or a high-pressure homogenizer improves the fibrillation efficiency.

In case where the cellulose fibers are fibrillated according to the above-mentioned treatment, the solid concentration of the cellulose fiber source material in the cellulose fiber dispersion to be treated is preferably 0.1% by weight or more, more preferably 0.2% by weight or more, even more preferably 0.3% by weight or more, and is preferably 10% by weight or less, more preferably 6% by weight or less. When the solid concentration in the cellulose fiber dispersion to be subjected to fibrillation treatment is too low, then the liquid amount would be too large relative to the amount of the cellulose fiber source material to be processed and therefore the efficiency is poor; but when the solid concentration is too high, then the flowability would worsen. Consequently, water is suitably added to the cellulose fiber dispersion being fibrillated to thereby control the concentration of the dispersion.

After the treatment with such a high-pressure homogenizer or the treatment with a high-speed rotary homogenizer, the fibers may be processed for further fibrillation (microgrinding) treatment as combined with ultrasonic treatment.

After the fibrillation treatment, the unfibrillated cellulose fibers in the cellulose fiber dispersion may be separated and removed using a centrifuge, thereby giving a supernatant liquid of a dispersion of more uniform and finer cellulose fibers. The condition for centrifuge is not specifically defined, as varying depending on the fibrillation treatment employed. For example, a centrifugal force of 3000 G or more is preferably given to the system, more preferably 10000 G or more. The centrifugal treatment time may be, for example 1 minute or more, preferably 5 minutes or more. When the centrifugal force is too small or the time is too short, then it is unfavorable since the poorly-fibrillated cellulose fibers would be insufficiently separated and removed.

In centrifuge, when the viscosity of the cellulose fiber dispersion is high, it is unfavorable since the separation efficiency would lower. Consequently, the viscosity of the cellulose fiber dispersion is, as the viscosity thereof measured at 25° C. and at a shear rate of 10 $sec^{-1}$, preferably 500 mPa·s or less, more preferably 100 mPa·s or less.

[Rubber Modifier Dispersion]

The rubber modifier dispersion of the present invention contains the above-mentioned rubber modifier of the present invention and a dispersion medium. The rubber modifier dispersion of the present invention may additionally contain any other additives and others within a range not detracting from the advantageous effects of the present invention.

The dispersion medium includes, for example, water, alcohol, ketone, ether, glycol ether, cyclic ether, amide, aromatic hydrocarbon, aprotic polar dispersion medium, etc. One alone or two or more types of these dispersion media may be used here either singly or as combined.

The solvent that is used as the dispersion medium for the rubber modifier is preferably such that the boiling point thereof is not too high from the viewpoint that the solvent must be removed in the subsequent step. Preferably, the boiling point of the solvent is 300° C. or lower, more preferably 200° C. or lower, even more preferably 180° C. or lower. From the viewpoint of handleability, the boiling point is preferably 70° C. or higher.

Specific examples of the aromatic hydrocarbon as the dispersion medium include benzene, toluene, xylene, etc.

The alcohols include methanol, ethanol, propanol, butanol, ethylene glycol, glycerin, etc.

The ketones (indicating liquids having a ketone group) include acetone, methyl ethyl ketone (MEK), methyl isobutyl ketone (MIBK), diisopropyl ketone, di-tert-butyl ketone, 2-heptanone, 4-heptanone, 2-octanone, cyclopentanone, cyclohexanone, cyclohexyl methyl ketone, acetophenone, acetylacetone, dioxane, etc. Of those, preferred are methyl ethyl ketone (MEK), methyl isobutyl ketone (MIBK), cyclopentanone, and cyclohexanone; and more preferred are methyl ethyl ketone (MEK) and cyclohexanone.

The ethers include diethyl ether, dimethyl ether, methyl ethyl ether, furan, dibenzofuran, etc. Of those, preferred are diethyl ether and furan.

The aprotic polar dispersion media include dimethyl sulfoxide (DMSO), formamide, N-methylformamide, N,N-dimethylformamide, acetamide, N-methylacetamide, N,N-dimethylacetamide, 2-pyrrolidone, N-methylpyrrolidone, etc.

Specific examples of the glycol ethers include ethylene glycol monomethyl ether, ethylene glycol monoethyl ether, ethylene glycol mono-n-butyl ether, ethylene glycol dimethyl ether, ethylene glycol monoethyl ether acetate, diethylene glycol monomethyl ether, diethylene glycol monoethyl ether, diethylene glycol mono-n-butyl ether, diethylene glycol dimethyl ether, diethylene glycol monoethyl ether acetate, propylene glycol monomethyl ether, propylene glycol mono-n-butyl ether, propylene glycol monomethyl ether acetate, etc.

The cyclic ethers include tetrahydrofuran, etc.

The content of the cellulose fibers (rubber modifier) in the rubber modifier dispersion of the present invention is not specifically defined. From the viewpoint of handleability that the viscosity and the liquid stability could be on a suitable level, the content is preferably 0.01% by weight or more relative to the total amount of the dispersion, more preferably 0.05% by weight or more, even more preferably 0.1% by weight or more, and is preferably 50% by weight or less, more preferably 40% by weight or less, even more preferably 30% by weight or less.

In the dispersion, any one of cellulose fibers (unmodified cellulose fibers) and modified cellulose fibers may be contained, or both the two may be contained. Specifically, the rubber modifier of the present invention may comprise unmodified cellulose fibers or modified cellulose fibers alone, or may be a mixture of unmodified cellulose fibers and modified cellulose fibers.

The rubber modifier dispersion of the present invention may further contain a rubber component. The rubber component may be contained in the fluid as a rubber latex. In this case, the dispersion medium component contained in the rubber latex may play a role of the dispersion medium for the rubber modifier dispersion, and the rubber modifier dispersion of the present invention may be one produced by dispersing the rubber modifier of the present invention in a rubber latex.

The rubber modifier dispersion produced by dispersing the rubber modifier of the present invention in a rubber latex may be one to be produced by mixing the above-mentioned cellulose fiber source material, directly as it is, with a rubber latex followed by fibrillation of the resultant mixture. In this case, one that has been prepared by dispersing the cellulose fiber source material in a rubber latex may be further fibrillated to give a rubber modifier dispersion that contains the rubber modifier of the present invention and has high dispersibility.

The fibrillation treatment in this case is described below.

As the dispersion medium for dispersing the cellulose fiber source material therein, generally used is water. However, also usable is the above-mentioned dispersion medium for the rubber modifier dispersion such as an organic solvent or the like. In this case, in general, the cellulose fiber source material is in a state dispersed in water, and therefore, water in the aqueous dispersion of the cellulose fiber source material may be previously substituted with an organic solvent. The method of substituting the solvent in the solvent-substituting step is not specifically defined. For example, there may be mentioned a method where water is removed through filtration from the aqueous dispersion containing a cellulose fiber source material, and an organic solvent to be used in fibrillation is added thereto, stirred and mixed, and again filtered to remove the organic solvent. As a result of repeating the addition of an organic solvent and filtration, the medium, water in the previous dispersion may be substituted with the organic solvent.

In case where the organic solvent to be used is insoluble in water, the previous medium may be once substituted with a water-soluble organic solvent and then may be thereafter substituted with the water-insoluble organic solvent.

Next, the cellulose fiber source material dispersion that contains a cellulose fiber source material is mixed with a rubber latex. In mixing them, a rubber latex may be directly added to and mixed with the dispersion.

The content of the cellulose fiber source material in the rubber latex dispersion before fibrillation is not specifically defined. Preferably, the content is 0.01% by weight or more relative to the total amount of the rubber latex dispersion before fibrillation, more preferably 0.05% by weight or more, and is preferably 50% by weight or less, more preferably 40% by weight or less.

The solid content of rubber (rubber component) in the rubber latex dispersion before fibrillation is not specifically defined. Preferably, the content is 2% by weight or more relative to the total amount of the rubber latex dispersion before fibrillation, more preferably 2.5% by weight or more, and is preferably 95% by weight or less, more preferably 80% by weight or less.

The solid content of the solvent (dispersion medium) in the rubber latex dispersion before fibrillation is not specifically defined. Preferably, the content is 1% by weight or more relative to the total amount of the rubber latex dispersion before fibrillation, more preferably 5% by weight or more, and is preferably 97.5% by weight or less, more preferably 95% by weight or less.

The ratio by weight of the rubber component to the solvent in the rubber latex dispersion before fibrillation is not specifically defined. Preferably, from the viewpoint of handleability that the viscosity and the liquid stability of the resultant, fibrillated rubber latex dispersion (or that is, the rubber modifier dispersion of the present invention) are bettered, the content of the solvent is preferably 5 parts by weight or more relative to 100 parts by weight of the rubber component, more preferably 25 parts by weight or more, and is preferably 2000 parts by weight or less, more preferably 1000 parts by weight or less.

The ratio by weight of the cellulose fiber source material to the rubber component in the rubber latex dispersion before fibrillation is not specifically defined. Preferably, the content of the cellulose fiber source material is preferably 2.5% by weight or more relative to the total amount of the cellulose fiber source material and the rubber component (100% by weight), more preferably 3% by weight or more, even more preferably 4% by weight or more, and is preferably 97.5% by weight or less, more preferably 97% by weight or less, even more preferably 95% by weight or less.

The method of fibrillating the unfibrillated rubber latex dispersion is the same as the fibrillation method for the cellulose fiber source material mentioned hereinabove.

In the rubber latex dispersion obtained after the fibrillation step (or that is, the rubber modifier dispersion of the present invention), fibrillated cellulose fibers are uniformly dispersed, and aggregation or flocculation of cellulose fibers is prevented, and the rubber latex dispersion enjoys excellent liquid stability.

In a composite body after vulcanization, which is obtained using the rubber modifier dispersion of the present invention that contains cellulose fibers and a rubber latex, the cellulose fibers are uniformly dispersed in the vulcanized rubber component and the composite body thereof exhibits a high modulus of elasticity and a low loss tangent.

The content of the cellulose fibers in the rubber modifier dispersion of the present invention may be suitably controlled depending on the amount of the source material, cellulose fiber source material to be used. Including a case that contains a rubber component and from the viewpoint of the stability of the dispersion, the fiber content is preferably 0.01% by weight or more relative to the total amount of the dispersion, more preferably 0.05% by weight or more, and is preferably 50% by weight or less, more preferably 40% by weigh for less, even more preferably 30% by weight or less.

The content of the solvent and the rubber component in the rubber latex dispersion after fibrillation (or that is, the rubber modifier dispersion of the present invention) is the same as the content of each component in the above-mentioned unfibrillated rubber latex dispersion, and the preferred range thereof is also the same as that in the latter.

In case where the rubber modifier dispersion of the present invention contains a rubber component, the amount of the cellulose fibers in the rubber modifier dispersion is generally 1 part by weight or more relative to 100 parts by weight of the rubber component, more preferably 3 parts by weight or more, even more preferably 5 parts by weight or more, and is generally 100 parts by weight or less, preferably 70 parts by weight or less, more preferably 50 parts by weight or less. Falling within the range, in particular, the reinforcing effect of the improving material is enhanced and the rubber workability thereof is bettered.

To the rubber modifier dispersion of the present invention, any other additive heretofore used in the field of rubber industry may be added, in addition to the cellulose fibers and the rubber component therein. For example, as other reinforcing materials, there are mentioned inorganic or organic fillers such as silica particles, carbon black, fibers, etc.; as well as silane coupling agent, vulcanizing agent, stearic acid, vulcanization promoter, vulcanization-promoting aid, oil, cured resin, wax, antiaging agent, etc.

Of those, as the vulcanizing agent, usable are organic peroxides or sulfur-containing vulcanizing agents. The organic peroxides may be any ones heretofore used in the field of rubber industry. Above all, preferred are dicumyl peroxide, t-butylperoxy-benzene, di-t-butylperoxy-diisopropylbenzene. As the sulfur-containing vulcanizing agents, for example, usable are sulfur, morphine disulfide, etc. Above all, preferred is sulfur. One alone or two or more of these vulcanizing agents may be used here either singly or as combined.

The amount of the vulcanizing agent in the rubber modifier dispersion of the present invention is, in a case where the agent is sulfur, generally 7.0 parts by weight or less relative to 100 parts by weight of the rubber component, and preferably 6.0 parts by weight or less. Also in general, the amount is 1.0 part by weight or more, preferably 3.0 parts by weight or more, more preferably 4.0 parts by weight or more.

[Rubber Composition]

The rubber composition of the present invention contains the rubber modifier of the present invention and a rubber component (rubber). Also, the rubber composition of the present invention is produced using the rubber modifier dispersion of the present invention. The rubber composition of the present invention may be an unvulcanized one or a vulcanized one.

A production method for the rubber composition of the present invention is described below.

The production method for the rubber composition of the present invention may optionally include an addition step of adding a rubber component before the complexing step therein to be described in detail hereinunder.

<Complexing Step>

In the complexing step, the rubber modifier dispersion that contains a rubber component is vulcanized (vulcanization step) to give a rubber composition containing cellulose fibers and the vulcanized rubber component.

The rubber composition of the present invention may be produced by removing, if desired, the solvent from the rubber modifier dispersion containing a rubber component, then further mixing it with a rubber component and various additives such as those mentioned above, using a rubber kneading machine or the like and according to a known method, and thereafter shaping the resulting mixture and vulcanizing it in a known method.

Various methods may be employed for the shaping to be attained prior to the vulcanization step, and for example, the rubber modifier dispersion containing a rubber component may be applied onto a substrate to form a coating film thereon, or the dispersion may be cast into a mold, or may be extruded out. In this process, if desired, the shaped body may be dried to remove the solvent. For example, the solvent such as water or the like may be removed from the cellulose fibers dispersed in the rubber modifier dispersion using the rubber-improving matter dispersion, then necessary additives are added thereto to prepare a rubber composition, the composition is kneaded and, while kept still unvulcanized, this is extruded out and worked into a form corresponding to the part to which it is applied, then shaped according to an ordinary method on a shaping machine to thereby shape the unvulcanized rubber composition. Thus shaped, the unvulcanized rubber composition is heated under pressure in a vulcanizing machine to give a vulcanized rubber composition. The vulcanized rubber composition has good durability.

The condition for the vulcanization step is not specifically defined. The temperature in the step may be one not lower than the temperature at which the rubber component is vulcanized into vulcanized rubber. Above all, from the viewpoint of removing the organic solvent through evaporation, the heating temperature is preferably 60° C. or higher, more preferably 100° C. or higher. On the other hand, from the viewpoint of preventing the cellulose fibers from being decomposed, the heating temperature is preferably 250° C. or lower, more preferably 200° C. or lower. The heating time is, from the viewpoint of the productivity, generally 3 minutes or more, preferably 5 minutes or more, and is preferably 180 minutes or less.

The heat treatment may be carried out plural times, in which the temperature and the heating time may be varied.

<Content of Cellulose Fibers>

The content of the cellulose fibers in the rubber composition of the present invention may be suitably controlled depending on the intended object. From the viewpoint of the reinforcing effect, the content is preferably 0.5% by weight or more relative to the total amount of the rubber composition, more preferably 1% by weight or more, and is preferably 50% by weight or less, preferably 40% by weight or less, more preferably 30% by weight or less.

<Ratio by weight of Cellulose Fibers to Rubber Component>

The ratio by weight of the cellulose fibers to the rubber component contained in the rubber composition of the present invention is the same as the ratio by weight of the cellulose fibers to the rubber component in the rubber modifier dispersion containing a rubber component of the present invention.

The amount of the cellulose fibers is generally 1 part by weight or more relative to 100 parts by weight of the rubber component, preferably 3 parts by weight or more, more preferably 5 parts by weight or more, and is generally 100 parts by weight or less, preferably 70 parts by weight or less, more preferably 50 parts by weight or less. When the amount of the cellulose fibers is 1 part by weight or more, then the reinforcing effect of the composition can be higher, and when the amount is 100 parts by weight or less, then the rubber workability can be bettered.

<Dispersion State of Cellulose Fibers>

In the rubber composition of the present invention, the cellulose fibers do not form aggregates but stably disperse in the vulcanized rubber component, and therefore, owing to the reinforcing effect of the cellulose fibers, the rubber composition can attain an increased modulus of elasticity and, in addition, since the fiber diameter is small, the composition does not interfere with the elongation intrinsic to rubber. Consequently, it is considered that the rubber composition can attain both high elongation at break and low heat generation.

In the rubber composition of the present invention, the dispersion state of the cellulose fibers can be confirmed though observation of the cross-sectional structure of the composition with SEM, etc.

EXAMPLES

The present invention is described more concretely with reference to the following Examples, but not overstepping the scope and the spirit thereof, the invention is not limited at all by the description of the following Examples.

In the following, the phosphoric acid-derived group introduction amount and the carboxyl group amount in cellulose were measured according to the above-mentioned methods.

The number-average fiber diameter and the fiber length of cellulose fibers were measured as follows, using an atomic force microscope (AFM). However, in Comparative Example 2, these were measured as follows, using SEM.

<AFM>
Method: atomic force microscopy (tapping mode)
Probe: unmodified Si-made cantilever (NCH)
Atmosphere: at room temperature, in air (humidity 50% or so)
Apparatus: Bulker's Digital Instrument Nanoscope III
Number of data sampling sites: 512×512 points
Type of AFM image: height image, phase image (for recognizing the fibers one by one) Image analysis method: The fibers are traced from the AFM image thereof, each one fiber is extracted out, and the maximum value of the height of one fiber was measured as the thickness of the fiber. The measured data were averaged to give a number-average fiber diameter.

In addition, the fiber length was measured from the observed image, and the fiber length distribution was determined.

<SEM>

A diagonal line was drawn on a 30,000-powered SEM picture, and 12 fibers around the line were randomly extracted out. The thickest fiber and the thinnest fibers were removed, and the remaining 10 fibers were measured. The found data of those fibers were averaged to give a number-average fiber diameter.

Production Example 1

Preparation of Cellulose Fibers 1 (Carboxy Group-Containing Cellulose Fibers)

40 g, as a pulp thy weight, of bleached hardwood kraft pulp (LBKP, by Oji Paper: water content 30%, freeness 600 mL csf) was sampled as a cellulose fiber source material, suspended in 500 ml of 0.1 M sulfuric acid and stirred. The suspension was filtered under reduced pressure through filter paper to give LBKP wetted with diluted sulfuric acid. LBKP was put in a separable flask, and exposed to aeration with ozone-containing oxygen gas generated from an ozone gas generator (Ecodesign's ED-OG-A10 Model) (gas flow rate 4 L/min, ozone concentration 32 g/m$^3$, ozone generation amount 20 g/Hr) for 5 hours. Subsequently, this was well washed with ion-exchanged water and dewatered to give ozone-treated cellulose fibers.

150 g of an aqueous 2 wt % sodium chlorite solution having a controlled pH of 4 was poured onto 50 g of the resultant, ozone-treated cellulose fibers (solid concentration, 20% by weight), stirred and then left statically at room temperature for 48 hours. This was repeatedly washed in suspension with ion-exchanged water to give carboxyl group-containing cellulose fibers 1. The carboxyl group amount in the resultant, carboxyl group-containing cellulose fibers 1 was 0.47 mmol/g (cellulose fibers 1).

Production Example 2

Preparation of Cellulose Fibers 2 (Carboxy Group-Containing Cellulose Fibers)

20 g, as a pulp dry weight, of bleached hardwood kraft pulp (LBKP, by Oji Paper: water content 30%, freeness 600 mL csf), as a cellulose fiber source material, and 2 L of air were put into a container, and then 15 L of an ozone/oxygen mixed vapor having an ozone concentration of 200 g/m$^3$ was added thereto, and shaken at 25° C. for 2 minutes, then statically left for 6 hours in that order, and thereafter ozone and air were removed from the container to finish ozone treatment. This operation was repeated twice, and then this was sufficiently washed with ion-exchanged water and dewatered to give ozone-treated cellulose fibers.

200 g of an aqueous 0.2 wt % sodium chlorite solution (corresponding to 3% by weight of sodium chlorite relative to the dry weight of the cellulose fibers) of which the pH was controlled to be 4 to 5 with hydrochloric acid was added to the resultant, ozone-treated cellulose fibers (solid concentration, 20% by weight), and treated at 70° C. for 3 hours to give carboxy group-containing cellulose fibers 2. The carboxy group amount in the resultant, carboxy group-containing cellulose fibers 2 was 0.47 mmol/g (cellulose fibers 2).

Production Example 3

Preparation of Cellulose Fibers 3 (Cellulose Phosphate Fibers)

6.75 g of sodium dihydrogenphosphate dihydrate and 4.83 g of disodium hydrogenphosphate were dissolved in 19.62 g of water to prepare an aqueous phosphorylation reagent. The pH of the aqueous phosphorylation reagent was 6.0 at 25° C.

As a cellulose fiber source material, water was added to bleached softwood kraft pulp (by Oji Paper, water content 50%, Canada standard freeness (CSF) measured according to JIS P8121 (1995) 700 ml) so as to have a concentration of 4% by weight, and using a double disc refiner, this was refined so that the anomalous CSF (according to JIS P8121 (1995) except that the plain weave was 80 mesh and the pulp sampling amount was 0.3 g) could be 250 ml and the mean fiber length could be 0.68 mm, thereby giving a pulp slurry. The resultant pulp slurry was diluted to be 0.3% by weight, and then made into a pulp sheet having a water content of 90% (absolute dry weight 3 g, thickness 200 μm) according to a papermaking process. The pulp sheet was immersed in 31.2 g of the above-mentioned aqueous phosphorylation reagent (80.2 parts by weight as the phosphorus element amount relative to 100 parts by weight of the dry pulp), and then dried with an air drier (Yamato Chemical's DKM400) at 105° C. for 1 hour, and then heated with an air drier (above-mentioned DKM400) at 150° C. for 1 hour to give a pulp sheet where a phosphoric acid group had been introduced into the cellulose.

Next, 500 ml of ion-exchanged water was added to the phosphoric acid group-introduced pulp sheet, washed with stirring, filtered and dewatered to give a dewatered pulp. The resultant dewatered pulp was diluted with 300 ml of ion-exchanged water, and 5 ml of an aqueous 1 N sodium hydroxide solution was added thereto little by little with stirring, thereby to give a pulp slurry having a pH of from 12 to 13. The pulp slurry was filtered and dewatered, washed with 500 ml of ion-exchanged water and filtered for dehydration. This operation was repeated three times, and finally a phosphate cellulose was obtained.

X-ray diffractometry confirmed that the cellulose maintained cellulose-I type crystal, and IR absorption spectrometry by FT-IR showed phosphoric acid group-based absorption at 1230 to 1290 cm$^{-1}$, and confirmed addition of the phosphoric acid group to the cellulose.

The phosphoric acid group introduction amount was 0.59 mmol/g (cellulose fibers 3).

Production Example 4

Preparation of Cellulose Fibers 4 (Carboxy Group-Containing Acetylated Cellulose Fibers)

In the same manner as in Production Example 2, carboxy group-containing cellulose fibers were produced. The carboxy group amount in the resultant carboxy group-containing cellulose fibers was 0.57 mmol/g.

2000 parts by weight of acetic anhydride was added to 100 parts by weight of the resulting, carboxy group-containing cellulose fibers, the inside of the flask was purged with nitrogen gas, and then this was heated up to 60° C. and kept as such for 1 hour. Subsequently, this was heated up to 100° C. and reacted for 2 hours. After the reaction, acetic anhydride was removed through filtration, and this was washed in suspension with methanol repeatedly three times. Subsequently, this was repeated washed in suspension with ion-exchanged water, and the washing end point was the time at which the pH of the wash waste reached at least 5. Subsequently, this was filtered under reduced pressure through filter paper to give carboxy group-containing acetylated cellulose fibers.

The acetyl group amount in the carboxy group-containing acetylated cellulose fibers was 3.1 mmol/g.
(Cellulose Fibers 4)

The above-mentioned acetyl group amount was determined according to a titration method. Concretely, 0.05 g of the dried cellulose fibers are accurately weighed, and 1.5 ml of ethanol and 0.5 ml of distilled water are added thereto. This is statically left in a hot bath at 60 to 70° C. for 30 minutes, and then 2 ml of an aqueous 0.5 M sodium hydroxide solution is added thereto. This is statically kept in a hot bath at 60 to 70° C. for 3 hours, and then ultrasonically shaken with a ultrasonic washer for 30 minutes. This is titered with a 0.2 M hydrochloric acid standard solution using phenolphthalein as an indicator.

Here, from the amount Z (ml) of the aqueous 0.2 M hydrochloric acid solution needed in titration and the amount $Z_0$ (ml) of the aqueous 0.2 N hydrochloric acid solution needed in titration of a blank sample (=sample with no dry cellulose), the amount of the acetyl group that had been introduced through chemical modification, Q (mol) is calculated according to the following formula:

$Q(mol)=(Z_0-Z)\times 0.2/1000$

The value Q is divided by the weight of the initially weighed cellulose fibers to give the amount of the acetyl group.

Example 1

The cellulose fibers 1 obtained in Production Example 1 were diluted with water to have a solid concentration of 0.5% by weight, and the cellulose fibers were fibrillated with a rotary high-speed homogenizer (M TECHNIQUE'S CLEAMIX 0.8S) at 20000 rpm for 60 minutes, and these were centrifuged at 12000 G for 10 minutes to give a slurry (rubber modifier dispersion) of nano-fibered cellulose fibers 1 (rubber modifier 1). The fiber diameter and the fiber length of the nano-fibered cellulose fibers 1 were measured, and the number-average fiber diameter was 5 nm and the number of the cellulose fibers having a fiber length of 450 nm or less was 92% of all the cellulose fibers.

Next, the slurry of the rubber modifier 1 was added to a natural rubber latex (solid concentration 61% by weight) in an amount of 5 parts by weight as the solid content of cellulose relative to 100 parts by weight of the rubber latex, then desalted water was added thereto so as to control the solid concentration of cellulose and rubber to be 0.3% by weight. Next, these were mixed using a homogenizer to give a rubber/cellulose fibers mixture fluid (rubber modifier dispersion). The dispersibility of the rubber modifier 1 in the resultant rubber modifier dispersion was visually evaluated, and the dispersibility was good.

Next, the resultant rubber modifier dispersion was put in a vat, and dried to solidness in an oven at 110° C. to give a rubber composition containing the rubber modifier 1. The dispersibility of the rubber modifier 1 in the resultant rubber composition was visually evaluated, and the dispersibility was good.

The resultant rubber composition (hereinafter referred to as "unvulcanized rubber composition") contained 5 parts by weight of the rubber modifier 1 relative to 100 parts by weight of the natural rubber latex therein. This was further mixed with 3 parts by weight of zinc flower (Zinc Flower No. 1, by Asaoka Ceram), 1 part by weight of a vulcanization promoter (N-tert-butyl-2-benzothiazolesulfenamide, by Wako Pure Chemical Industry), 2 parts by weight of sulfur (5% oil-processed powdery sulfur, by Tsurumi Chemical Industry) and 3 parts by weight of stearic acid (Wako Pure Chemical Industry), and kneaded.

Precisely, the other components than the vulcanization promoter and sulfur were added to the rubber composition 1, kneaded at 140° C. for 3 minutes using a kneading device (LABO PLASTOMILL μ, by Toyo Seiki), and the vulcanization promoter and sulfur were added thereto and further kneaded at 80° C. for 3 minutes. This was pressed and vulcanized under pressure at 160° C. for 10 minutes to give a rubber composition having a thickness of 1 mm (hereinafter referred to as vulcanized rubber composition).

The dispersibility of rubber modifier 1 in the resultant rubber composition was visually evaluated and, as a result, the dispersibility was good.

The resultant vulcanized rubber composition was formed into a predetermined dumbbell-shaped test piece and tested to evaluate the breaking strength, M300 and tan δ thereof.

The breaking strength and M300 were evaluated as follows. In a tensile test according to JIS K6251 (2010), the breaking strength and the tensile stress in 300% elongation of the vulcanized rubber composition were measured. Based on the data of Comparative Example 1 of natural rubber alone, as referred to as 100, the data of the test sample were expressed as the corresponding index number. The samples having a larger index number have more excellent reinforcing performance.

Tan δ was measured as follows. According to JIS K6394 (2007), the loss factor tan δ was measured at a temperature of 70° C., at a frequency of 10 Hz, at a static strain of 10% and at a dynamic strain of 2%. Based on the data of Comparative Example 1, as referred to as 100, the data of the test sample were expressed as the corresponding index number. The samples having a smaller index number have a smaller tan δ and hardly generate heat, or that is, the samples of the type are excellent in low-heat-generation performance.

The measurement results are shown in Table 1.

Example 2

A rubber modifier 2 was produced in the same manner as in Example 1 except that the cellulose fibers 2 obtained in Production Example 2 were used in place of the cellulose fibers 1. The fiber diameter and the fiber length of the rubber modifier 2 were measured. The number-average fiber diameter was 8 nm, and the number of the cellulose fibers having a fiber length of 450 nm or less was 75% of all the cellulose fibers.

A rubber modifier dispersion, an unvulcanized rubber composition and a vulcanized rubber composition were produced in the same manner as in Example 1 except that the rubber modifier 2 was used here. The dispersibility of the rubber modifier in the rubber modifier dispersion and the vulcanized rubber composition was visually evaluated, and as a result, the dispersibility was good in all of them.

Also in the same manner as in Example 1, the breaking strength, M300 and tan δ of the vulcanized rubber composition were measured, and the results are shown in Table 1.

Example 3

A rubber modifier 3 was produced in the same manner as in Example 1 except that the cellulose fibers 3 obtained in Production Example 3 were used in place of the cellulose fibers 1. The fiber diameter of the nano-fibered cellulose fibers 3 was measured. The number-average fiber diameter was 5 nm and the number of the cellulose fibers having a fiber length of 450 nm or less was 58% of all the cellulose fibers.

A rubber modifier dispersion, an unvulcanized rubber composition and a vulcanized rubber composition were produced in the same manner as in Example 1 except that the rubber modifier 3 was used here. The dispersibility of the rubber modifier 3 in the rubber modifier dispersion and the vulcanized rubber composition was visually evaluated, and as a result, the dispersibility was good in all of them.

Also in the same manner as in Example 1, the breaking strength, M300 and tan δ of the vulcanized rubber composition were measured, and the results are shown in Table 1.

Example 4

The cellulose fibers 4 obtained in Production Example 4 were diluted with water to have a solid concentration of 0.5% by weight. Using a rotary high-speed homogenizer (M Technic's Cleamix 0.8S), the cellulose fibers were fibrillated at 20000 rpm for 60 minutes, and then centrifuged at 38900 G for 30 minutes to give a slurry of nano-fibered cellulose fibers 4 (rubber modifier 4). The fiber diameter and the fiber length of the nano-fibered cellulose fibers 4 were measured. The number-average fiber diameter was 4 nm, and the number of the cellulose fibers having a fiber length of 450 nm or less was 89% of all the cellulose fibers.

A rubber modifier dispersion, an unvulcanized rubber composition and a vulcanized rubber composition were produced in the same manner as in Example 1 except that the rubber modifier 4 was used here. The dispersibility of the rubber modifier 4 in the rubber modifier dispersion and the vulcanized rubber composition was visually evaluated, and as a result, the dispersibility was good in all of them.

Also in the same manner as in Example 1, the breaking strength, M300 and tan δ of the vulcanized rubber composition were measured, and the results are shown in Table 1.

Comparative Example 1

A vulcanized rubber composition was produced in the same manner as in Example 1 except that cellulose fibers were not used, and the breaking strength, M300 and tan δ thereof were measured. The measured values of the breaking strength, M300 and tan δ are referred to as 100 each.

Comparative Example 2

As cellulose fibers, bleached hardwood kraft pulp (LBKP, by Oji Paper: water content 30%, freeness 600 mL csf) was diluted with water to have a solid concentration of 0.5% by weight, and then processed with a rotary high-speed homogenizer (M Technic's Cleamix 0.8S) at 20000 rpm for 60 minutes to fibrillate the cellulose fibers to give a rubber modifier 5. The fiber diameter and the fiber length of the rubber modifier 5 were measured. The number-average fiber diameter was 100 nm, and the number of the cellulose fibers having a fiber length of 450 nm or less was less than 50% of all the cellulose fibers.

A rubber modifier dispersion, an unvulcanized rubber composition and a vulcanized rubber composition were produced in the same manner as in Example 1 except that the rubber modifier 5 was used here. The dispersibility of the rubber modifier 5 in the rubber modifier dispersion and the vulcanized rubber composition was visually evaluated, and as a result, the dispersibility could not be said to be good in all of them.

Also in the same manner as in Example 1, the breaking strength, M300 and tan δ of the vulcanized rubber composition were measured, and the results are shown in Table 1.

Comparative Example 3

A rubber modifier 6 was produced in the same manner as in Example 1 except that a commercial product cellulose (Ceolus TG-101, by Asahi Kasei Chemicals) was used here in place of the cellulose fibers 1. The fiber diameter and the fiber length of the rubber modifier 6 were measured. The number-average fiber diameter was 15 nm, and the number of the cellulose fibers having a fiber length of 450 nm or less was 15% of all the cellulose fibers.

A rubber modifier dispersion, an unvulcanized rubber composition and a vulcanized rubber composition were produced in the same manner as in Example 1 except that the rubber modifier 6 was used here.

Also in the same manner as in Example 1, the breaking strength, M300 and tan δ of the vulcanized rubber composition were measured, and the results are shown in Table 1.

All the results in the above-mentioned Examples 1 to 4 and Comparative Examples 1 to 3 are shown in Table 1.

is low, but the breaking strength and the modulus of elasticity of the composition are low and the balance thereof is not good.

From the above, it is known that the rubber modifier of the present invention well disperses in rubber and is excellent in reinforcing performance, and that using the rubber modifier of the present invention gives a low-heat-generating rubber composition.

While the present invention has been described in detail and with reference to specific embodiments thereof, it will be apparent to one skilled in the art that various changes and modifications can be made therein without departing from the spirit and scope thereof.

The present application is based on a Japanese patent application (Patent Application 2012-233945) filed on Oct. 23, 2012 and a Japanese patent application (Patent Application 2013-216455) filed on Oct. 17, 2013, the contents of which are incorporated herein by reference.

The invention claimed is:

1. A rubber modifier comprising cellulose fibers,
   wherein the number of cellulose fibers having a fiber length of 450 urn or less, relative to the total number of the cellulose fibers in the rubber modifier, is 58% or more,
   wherein the cellulose fibers comprise cellulose fibers modified by introduction of an acyl group and a carboxyl group, and
   wherein a number-average fiber diameter of the cellulose fibers is 20 nm or less.

2. A rubber modifier dispersion comprising a rubber modifier and a dispersion medium,
   wherein the rubber modifier comprises cellulose fibers,
   wherein the number of cellulose fibers having a fiber

TABLE 1

| | | Example 1 | Example 2 | Example 3 | Example 4 | Comparative Example 1 | Comparative Example 2 | Comparative Example 3 |
|---|---|---|---|---|---|---|---|---|
| Components of Rubber Composition (part by weight) | Natural Rubber Latex | 100 | 100 | 100 | 100 | 100 | 100 | 100 |
| | Rubber modifier 1 | 5 | | | | | | |
| | Rubber modifier 2 | | 5 | | | | | |
| | Rubber modifier 3 | | | 5 | | | | |
| | Rubber modifier 4 | | | | 5 | | | |
| | Rubber modifier 5 | | | | | | 5 | |
| | Rubber modifier 6 | | | | | | | 5 |
| | Zinc Flower | 3 | 3 | 3 | 3 | 3 | 3 | 3 |
| | Vulcanization Promoter | 1 | 1 | 1 | 1 | 1 | 1 | 1 |
| | Sulfur | 2 | 2 | 2 | 2 | 2 | 2 | 2 |
| | Stearic Acid | 3 | 3 | 3 | 3 | 3 | 3 | 3 |
| Number-Average Fiber Diameter of Cellulose Fibers (nm) | | 5 | 8 | 5 | 4 | — | 100 | 15 |
| Proportion by number of Cellulose Fibers having a fiber length of 450 nm or less relative to all cellulose fibers (%) | | 92 | 75 | 58 | 89 | — | less than 50 | 15 |
| Evaluation of Physical Properties | Breaking Strength | 209 | 171 | 179 | 235 | 100 | 145 | 99 |
| | M300 (index) | 176 | 292 | 404 | 278 | 100 | 392 | 139 |
| | tanδ (index) | 150 | 160 | 235 | 156 | 100 | 278 | 85 |

As in Table 1, the rubber compositions (vulcanized rubber compositions) of Examples 1 to 4 using the rubber modifiers 1 to 4 of the present invention had a high modulus of elasticity and a high breaking strength, as compared with Comparative Example 1 of natural rubber alone. In addition, the heat generation index, tan δ of the compositions of the present invention is lower than that in Comparative Example 2 in which the dispersibility was poor, and it is known that the compositions of the present invention are low-heat-generating compositions. In Comparative Example 3, tan δ length of 450 nm or less, relative to the total number of the cellulose fibers in the rubber modifier, is 58% or more, wherein a boiling point of the dispersion medium is from 70° C. to 300° C., wherein a content of the cellulose fibers in the rubber modifier dispersion is from 0.01 wt. % to 50 wt. %, wherein the cellulose fibers comprise cellulose fibers modified by introduction of an acyl group and a carboxyl group, and wherein a number-average fiber diameter of the cellulose fibers is 20 nm or less.

3. The rubber modifier dispersion according to claim 2, further comprising a rubber component, wherein a content of the rubber component in the rubber modifier dispersion is from 2 wt. % to 95 wt. % relative to the total weight of the rubber modified dispersion.

4. A rubber composition comprising a rubber modifier and a rubber component,
wherein the rubber modifier comprises cellulose fibers, wherein the number of cellulose fibers having a fiber length of 450 nm or less, relative to the total number of the cellulose fibers in the rubber modifier, is 58% or more,
wherein a content of the cellulose fibers in the rubber composition is from 0.5 wt. % to 30 wt. % relative to the total the rubber composition,
wherein an amount of the cellulose fibers is from 1 part by weight to 100 parts by weight relative to 100 parts by weight of the rubber component,
wherein the cellulose fibers comprise cellulose fibers modified by introduction of an acyl group and a carboxyl group, and
wherein a number-average fiber diameter of the cellulose fibers is 20 nm or less.

5. The rubber modifier dispersion of claim 2, wherein the dispersion medium has a boiling point of from 70° C. to 200° C.

6. The rubber modifier comprising cellulose fibers of claim 1, wherein the number of the cellulose fibers having a fiber length of 450 nm or less, relative to the total number of the cellulose fibers in the rubber modifier is 60% or more.

7. The rubber modifier dispersion of claim 2, wherein the number of the cellulose fibers having a fiber length of 450 nm or less, relative to the total number of the cellulose fibers in the rubber modifier is 60% or more.

8. The rubber composition of claim 4, wherein the number of the cellulose fibers having a fiber length of 450 nm or less, relative to the total number of the cellulose fibers in the rubber modifier is 60% or more.

9. The rubber modifier comprising cellulose fibers of claim 1, wherein the acyl group is an acyl group having from 2 to 12 carbon atoms.

10. The rubber modifier dispersion of claim 2, wherein the acyl group is an acyl group having from 2 to 12 carbon atoms.

11. The rubber composition of claim 4, wherein the acyl group is an acyl group having from 2 to 12 carbon atoms.

12. The rubber modifier comprising cellulose fibers of claim 1, wherein a content of the carboxyl group is from 0.1 mmol/g to 3.0 mmol/g relative to the weight of the cellulose fibers.

13. The rubber modifier dispersion of claim 2, wherein a content of the carboxyl group is from 0.1 mmol/g to 3.0 mmol/g relative to the weight of the cellulose fibers.

14. The rubber composition of claim 4, wherein a content of the carboxyl group is from 0.1 mmol/g to 3.0 mmol/g relative to the weight of the cellulose fibers.

15. The rubber modifier comprising cellulose fibers of claim 1, wherein the number of the cellulose fibers having a fiber length of 450 nm or less, relative to the total number of the cellulose fibers in the rubber modifier, is 60% or more, and wherein a content of the carboxyl group the acyl group is from 0.1 mmol/g to 8.0 mmol/g in total relative to the weight of the cellulose fibers.

16. The rubber modifier dispersion of claim 2, wherein wherein the number of the cellulose fibers having a fiber length of 450 nm or less, relative to the total number of the cellulose fibers in the rubber modifier, is 60% or more, and wherein a content of the carboxyl group and the acyl group is from 0.1 mmol/g to 8.0 mmol/g in total relative to the weight of the cellulose fibers.

17. The rubber composition of claim 4, wherein the number of the cellulose fibers having a fiber length of 450 nm or less, relative to the total number of the cellulose fibers in the rubber modifier, is 60% or more, and wherein a content of the carboxyl group and the acyl group is from 0.1 mmol/g to 8.0 mmol/g in total relative to the weight of the cellulose fibers.

18. A rubber composition comprising a rubber modifier and a rubber component,
wherein the rubber modifier comprises cellulose fibers, wherein the number of cellulose fibers having a fiber length of 450 nm or less, relative to the total number of the cellulose fibers in the rubber modifier, is 58% or more,
wherein a content of the cellulose fibers in the rubber composition is from 0.5 wt. % to 4.4 wt. % relative to the total the rubber composition,
wherein an amount of the cellulose fibers is from 1 part by weight to 100 parts by weight relative to 100 parts by weight of the rubber component,
wherein the cellulose fibers comprise cellulose fibers modified by introduction of a phosphoric acid-derived group,
wherein a content of the phosphoric acid-derived group is from 0.1 mmol/g to 8.0 mmol/g in total relative to the weight of the cellulose fibers, and
wherein a number-average fiber diameter of the cellulose fibers is 20 nm or less.

* * * * *